(12) United States Patent
Vrankovic et al.

(10) Patent No.: US 8,970,148 B2
(45) Date of Patent: Mar. 3, 2015

(54) METHOD AND APPARATUS FOR REDUCING RADIATED EMISSIONS IN SWITCHING POWER CONVERTERS

(75) Inventors: Zoran Vrankovic, Greenfield, WI (US); Craig Winterhalter, Mequon, WI (US); Gary Skibinski, Milwaukee, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 190 days.

(21) Appl. No.: 13/562,889

(22) Filed: Jul. 31, 2012

(65) Prior Publication Data

US 2014/0035497 A1 Feb. 6, 2014

(51) Int. Cl.
*H02P 6/00* (2006.01)

(52) U.S. Cl.
USPC ....... 318/400.25; 318/503; 318/801; 361/707

(58) Field of Classification Search
USPC ............ 318/400.25, 494, 611, 722, 767, 503, 318/801; 363/37, 40; 361/707
See application file for complete search history.

(56) References Cited

U.S. PATENT DOCUMENTS

| | | | | |
|---|---|---|---|---|
| 5,461,351 | A * | 10/1995 | Shusterman | 333/181 |
| 5,831,842 | A * | 11/1998 | Ogasawara et al. | 363/40 |
| 6,028,405 | A * | 2/2000 | Kume et al. | 318/400.24 |
| 6,122,184 | A * | 9/2000 | Enjeti et al. | 363/47 |
| 6,288,915 | B1 * | 9/2001 | Stemmler et al. | 363/34 |
| 6,509,807 | B1 * | 1/2003 | Anthony et al. | 333/12 |
| 6,690,565 | B2 * | 2/2004 | Montreuil | 361/232 |
| 6,781,802 | B2 * | 8/2004 | Kato et al. | 361/22 |
| 7,042,303 | B2 * | 5/2006 | Anthony et al. | 333/12 |
| 7,068,005 | B2 * | 6/2006 | Baker | 318/611 |
| 7,141,899 | B2 * | 11/2006 | Anthony et al. | 310/68 R |
| 7,274,576 | B1 * | 9/2007 | Zargari et al. | 363/39 |
| 7,589,984 | B2 * | 9/2009 | Salomaki | 363/41 |
| 7,593,208 | B2 * | 9/2009 | Anthony et al. | 361/118 |
| 7,606,052 | B2 * | 10/2009 | Akagi | 363/40 |
| 7,738,268 | B2 * | 6/2010 | Baudesson et al. | 363/39 |
| 7,957,166 | B2 * | 6/2011 | Schnetzka et al. | 363/56.03 |
| 7,994,876 | B2 * | 8/2011 | Feng et al. | 333/181 |
| 8,115,444 | B2 * | 2/2012 | De et al. | 318/801 |
| 8,174,810 | B2 * | 5/2012 | Tallam et al. | 361/91.1 |
| 8,228,019 | B2 * | 7/2012 | Higuchi et al. | 318/722 |
| 8,258,739 | B2 * | 9/2012 | Higuchi et al. | 318/811 |
| 8,319,462 | B2 * | 11/2012 | Induka et al. | 318/400.25 |

(Continued)

OTHER PUBLICATIONS

Henry W. Ott; "Electromagnetic Compatibility Engineering"; Chapter 12—Digital Circuit Radiation; (13 pages; p. 465-489); Publisher: John Wiley & Sons, Inc.—2009.

(Continued)

*Primary Examiner* — Paul Ip
(74) *Attorney, Agent, or Firm* — Boyle Frederickson, S.C.

(57) ABSTRACT

A filter for reducing radiated emissions in switching power converters such as a motor drive is disclosed. The switching power converter modulates a DC voltage input to generate a desired AC voltage output. Capacitors are connected in parallel between each output phase and a common connection, which may be a ground connection. The magnitude and layout of the capacitors are selected to minimize current conducted by the capacitors. The capacitors may be surface mount technology located proximate to the switching devices or the capacitors may be incorporated in the circuit board on which the switching devices are mounted. The filter may be applied to any of the switching elements in a motor drive, such as the inverter section, an active rectifier section, or a switched mode power supply.

14 Claims, 8 Drawing Sheets

(56) References Cited

U.S. PATENT DOCUMENTS

| | | | | |
|---|---|---|---|---|
| 8,324,980 B2* | 12/2012 | Schutten et al. | 333/12 |
| 8,325,500 B2* | 12/2012 | Schueneman | 363/47 |
| 8,362,733 B2* | 1/2013 | Inuduka et al. | 318/494 |
| 8,503,180 B2* | 8/2013 | Nojima | 361/707 |
| 8,570,773 B2* | 10/2013 | Skibinski et al. | 363/37 |
| 2003/0079486 A1* | 5/2003 | Kato et al. | 62/215 |
| 2004/0124949 A1* | 7/2004 | Anthony et al. | 333/181 |
| 2006/0043920 A1* | 3/2006 | Baker | 318/611 |
| 2006/0193051 A1* | 8/2006 | Anthony et al. | 359/559 |
| 2006/0227483 A1* | 10/2006 | Akagi | 361/118 |
| 2007/0019352 A1* | 1/2007 | Anthony | 361/118 |
| 2007/0121353 A1* | 5/2007 | Zhang et al. | 363/39 |
| 2007/0211501 A1* | 9/2007 | Zargari et al. | 363/39 |
| 2007/0278988 A1* | 12/2007 | De et al. | 318/801 |
| 2007/0296374 A1* | 12/2007 | Baudesson et al. | 318/772 |
| 2008/0253054 A1* | 10/2008 | Anthony et al. | 361/118 |
| 2008/0303469 A1* | 12/2008 | Nojima | 318/503 |
| 2009/0303652 A1* | 12/2009 | Tallam et al. | 361/111 |
| 2010/0019862 A1* | 1/2010 | Feng et al. | 333/181 |
| 2010/0045108 A1* | 2/2010 | Hu et al. | 307/31 |
| 2010/0219902 A1* | 9/2010 | Schutten et al. | 333/12 |
| 2011/0050135 A1* | 3/2011 | Higuchi et al. | 318/400.2 |
| 2011/0266988 A1* | 11/2011 | Inuduka et al. | 318/400.25 |
| 2011/0292695 A1* | 12/2011 | Skibinski et al. | 363/37 |
| 2011/0299308 A1* | 12/2011 | Cheng et al. | 363/37 |
| 2012/0014143 A1* | 1/2012 | Schueneman | 363/40 |
| 2012/0068655 A1* | 3/2012 | Inuduka et al. | 318/494 |
| 2012/0187894 A1* | 7/2012 | Higuchi et al. | 318/811 |
| 2012/0201056 A1* | 8/2012 | Wei et al. | 363/37 |
| 2013/0106255 A1* | 5/2013 | Tamura et al. | 310/68 D |
| 2013/0141182 A1* | 6/2013 | Beyerlein et al. | 333/17.2 |
| 2013/0147419 A1* | 6/2013 | Sakai et al. | 318/722 |
| 2013/0169048 A1* | 7/2013 | Yasuda et al. | 307/31 |
| 2013/0181520 A1* | 7/2013 | Tsuji et al. | 307/31 |
| 2013/0221895 A1* | 8/2013 | Kanda et al. | 318/767 |
| 2013/0329471 A1* | 12/2013 | Escobar et al. | 363/40 |

OTHER PUBLICATIONS

Henry W. Ott; "Electromagnetic Compatibility Engineering"; Chapter 13—Conducted Emissions; (25 pages; p. 493-541); Publisher: John Wiley & Sons, Inc.—2009.

* cited by examiner

METHOD AND APPARATUS FOR REDUCING RADIATED EMISSIONS IN SWITCHING POWER CONVERTERS

BACKGROUND OF THE INVENTION

The subject matter disclosed herein relates generally to reducing radiated emissions in switching power converters and, more specifically, to a motor drive including a filter which reduces emissions radiated from the motor leads.

As is known to those skilled in the art, motor drives permit variable speed control of motors that would otherwise run at a single speed if connected directly to a power source. Motor drives include many configurations, but a common configuration includes a rectifier section, which converts an alternating current (AC) power source into a direct current (DC) voltage. The DC voltage is transferred to a DC bus having a capacitance connected across the bus to reduce the ripple voltage resulting from rectifying the AC power into a DC voltage. The DC voltage is subsequently provided as an input to an inverter section, which converts the DC voltage into an AC voltage of varying frequency and magnitude according to the operating requirements of the motor.

In order to generate the AC voltage of varying frequency and magnitude, the motor drive modulates, or switches, the DC voltage on and off at a periodic interval to output a desired average value of voltage over the interval. A modulation period is selected over which the desired average voltage is output. The modulation period is the inverse value of the modulation frequency, which is dependent on factors such as the power rating, topology, or the modulation technique of the motor drive and may be, for example, between 1-15 kHz. The motor drive connects the DC bus to the output for a percentage of the modulation period. Thus, the output voltage is either equal to zero volts or to the voltage level on the DC bus; however, the resulting average value of the output voltage over the modulation period is equal to the voltage level on the DC bus multiplied by the percentage of the modulation period for which the output is connected to the DC bus. Because the modulation frequency is much greater than the desired AC output frequency of the motor (e.g., between 0 and 60 Hertz), the resulting average output voltage resembles an AC output voltage at the desired operating frequency of the motor.

The rapid switching of the output to the DC bus, however, can generate electrical currents resulting in radiated emissions from a cable connecting the output of the motor drive to the motor being controlled. In order to generate the desired average value of output voltage as previously discussed, it is desirable to rapidly turn on and off the solid state switching device. The solid state switching devices are, therefore, turned on and off within tens or hundreds of nanoseconds. In addition, some overshoot and subsequent oscillation as the output voltage settles may generate electrical signals in the tens or hundreds of megahertz, which are present at the output of the motor drive.

It is desirable to limit the magnitude of radiated emissions such that the emissions do not interfere with other electronic equipment. Presently, it is known to reduce the magnitude of the radiated emissions by including either a ferrite core or a common mode inductor on the output of the motor drive. However, both the ferrite core and common mode inductor are connected to the output of the motor drive. The wire gauge of the electrical conductors needed to carry the rated output current from the motor drive necessarily increase as well. However, the magnitude of the radiated emissions does not necessarily increase in a corresponding manner. For example, the magnitude of the radiated emissions may be in the microamps, but the output current of the motor drive may be in the tens or hundreds of amps. Because the ferrite core and the common mode inductor are in series with the output of the motor drive, they must be sized to handle the conductors on the output of the motor drive and similarly increase in size and expense as well.

BRIEF DESCRIPTION OF THE INVENTION

The subject matter disclosed herein describes a filter for reducing radiated emissions in switching power converters such as a motor drive. The switching power converter modulates a DC voltage input to generate a desired AC voltage output. Capacitors are connected in parallel between each output phase and a common connection, which may be a ground connection. The magnitude and layout of the capacitors are selected to minimize current conducted by the capacitors. The capacitors may be surface mount technology located proximate to the switching devices or the capacitors may be incorporated in the circuit board on which the switching devices are mounted. The filter may be applied to any of the switching elements in a motor drive, such as the inverter section, an active rectifier section, or a switched mode power supply.

According to one embodiment of the invention, an inverter for a motor drive has a filter for reducing radiated emissions generated by the inverter. The inverter includes an input configured to receive a direct current (DC) voltage, having a positive terminal and a negative terminal, and an output, having at least two terminals, the output configured to provide an alternating current (AC) voltage. At least one switching device is configured to selectively connect one of the positive terminal and the negative terminal to the output. The inverter also includes at least one ground connection and a capacitor electrically connected between each terminal of the output and one of the ground connections.

According to another embodiment of the invention, a power conversion section for a motor drive, configured to convert a direct current (DC) voltage present on a DC bus having a positive rail and a negative rail to a three-phase alternating current (AC) voltage, includes a first electrical conductor configured to conduct a first phase of the three-phase alternating current, a second electrical conductor configured to conduct a second phase of the three-phase alternating current, and a third electrical conductor configured to conduct a third phase of the three-phase alternating current. A plurality of switching devices are each configured to selectively connect one of the positive rail and the negative rail to one of the first electrical conductor, the second electrical conductor, and the third electrical conductor. A first capacitor is electrically connected between the first electrical conductor and a common electrical connection, a second capacitor is electrically connected between the second electrical conductor and the common electrical connection, and a third capacitor is electrically connected between the third electrical conductor and the common electrical connection.

According to another embodiment of the invention, a power converter for a motor drive has a filter for reducing radiated emissions generated by the inverter. The power converter includes an input configured to receive a direct current (DC) voltage having a positive terminal and a negative terminal and an output configured provide a multi-phase alternating current (AC) voltage. The output has a terminal corresponding to each phase of the AC voltage. The power converter also includes a plurality of switching devices and a capacitor electrically connected between each output terminal and a common electrical connection. A pair of switching devices corresponds to each output terminal. A first of the pair of switching devices selectively connects the DC voltage positive terminal to the corresponding output terminal and a second of the pair of switching devices selectively connects the DC voltage negative terminal to the corresponding output terminal.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION OF THE PREFERRED EMBODIMENTS

Figure 1:
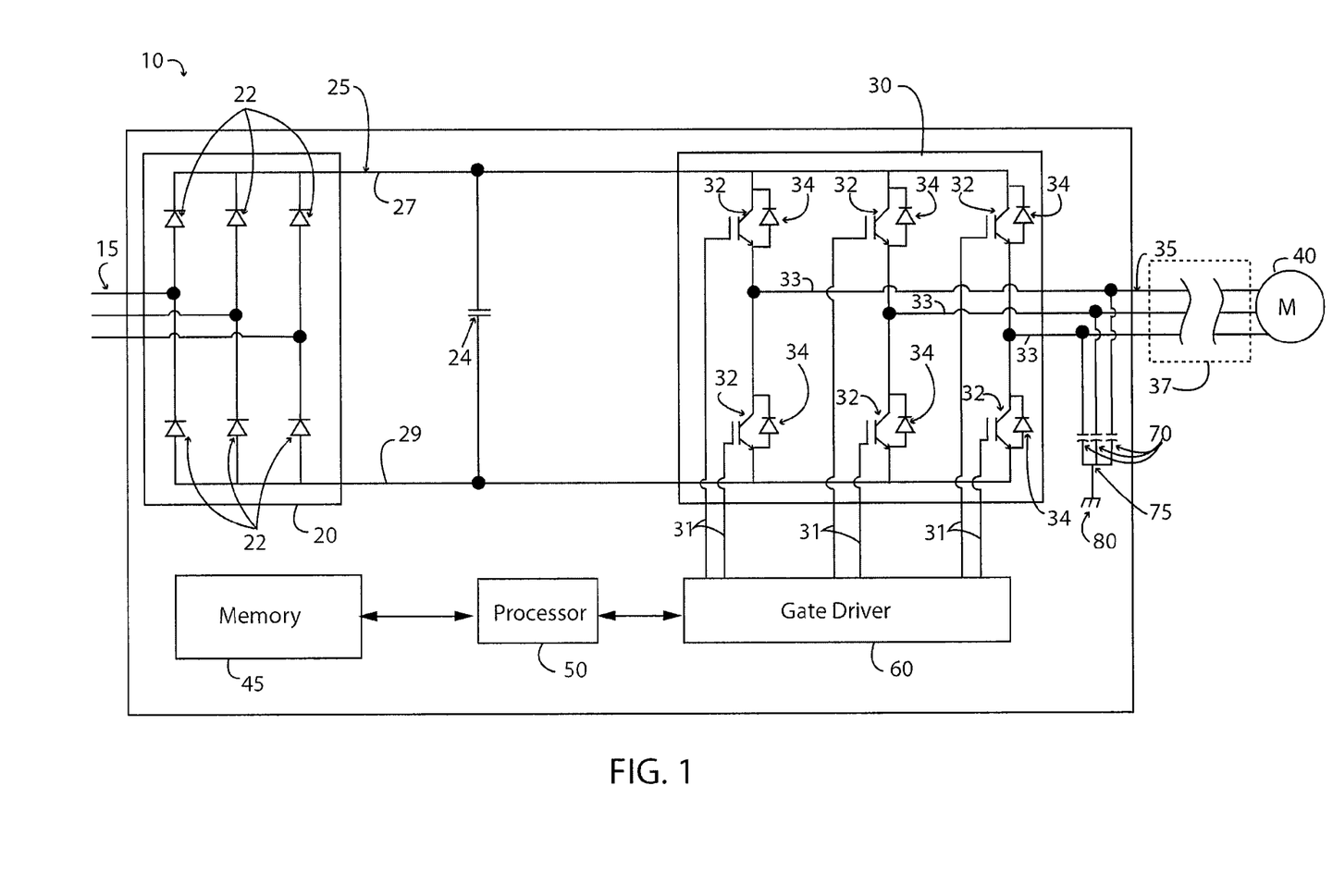
FIG. 1 is a schematic representation of a motor drive incorporating one embodiment of the present invention.

Turning initially to FIG. 1, a motor drive 10, according to one embodiment of the invention, is configured to receive a three-phase input power 15 at rectifier section 20. The rectifier section 20 may include any electronic device suitable for passive or active rectification as is understood in the art. The illustrated rectifier section 20 includes a set of diodes 22 forming a diode bridge that rectifies the three-phase input power 15 to a DC voltage on the DC bus 25. Optionally, the rectifier section 20 may include other solid state devices including, but not limited to, thyristors, silicon controlled rectifiers (SCRs), or transistors to convert the input power 15 to a DC voltage for the DC bus 25. The DC voltage potential is present between a positive rail 27 and a negative rail 29 of the DC bus 25. A DC bus capacitor 24 is connected between the positive and negative rails, 27 and 29, to reduce the magnitude of the ripple voltage resulting from converting the AC voltage to a DC voltage. It is understood that the DC bus capacitor 24 may be a single capacitor or multiple capacitors connected in parallel, in series, or a combination thereof. The magnitude of the voltage potential between the negative and positive rails, 29 and 27, is generally equal to the magnitude of the peak of the AC input voltage.

The DC bus 25 is connected in series between the rectifier section 20 and the inverter section 30. The inverter section 30 consists of switching elements, such as transistors, thyristors, or SCRs as is known in the art. The illustrated inverter section 30 includes an insulated gate bipolar transistor (IGBT) 32 and a free wheeling diode 34 connected in pairs between the positive rail 27 and each phase of the output voltage as well as between the negative rail 29 and each phase of the output voltage. Each of the IGBTs 32 receives gating signals 31 to selectively enable the transistors 32 and to convert the DC voltage from the DC bus 25 into a controlled three phase output voltage to the motor 40. When enabled, each transistor 32 connects the respective rail 27, 29 of the DC bus 25 to an electrical conductor 33 connected between the transistor 32 and the output terminal 35. The electrical conductor 33 is selected according to the application requirements (e.g., the rating of the motor drive 10) and may be, for example, a conductive surface on a circuit board to which the transistors 32 are mounted or a bus bar connected to a terminal from a power module in which the transistors 32 are contained. The output terminals 35 of the motor drive 10 are connected to a motor 40 via a cable 37 including electrical conductors connected to each of the output terminals 35. The cable 37 may also include a shield surrounding the conductors and electrically connected to a ground connection.

One or more modules are used to control operation of the motor drive 10. The modules may be stored programs executed on a processor, logic circuits, or a combination thereof. The motor drive 10 includes a non-transitory storage device, or memory 45, configured to store data and programs, which include a series of instructions executable by the processor 50. It is contemplated that the memory 45 may be a single device, multiple devices, or incorporated, for example, as a portion of another device such as an application specific integrated circuit (ASIC). The processor 50 is in communication with the memory 45 to read the instructions and data as required to control operation of the motor drive 10. According to one embodiment of the invention, the processor 50 receives a reference signal identifying desired operation of the motor 40 connected to the motor drive 10. The reference signal may be, for example, a speed reference or a torque reference. The processor 50 similarly receives feedback signals indicating the current operation of the motor drive 10, which may include, but are not limited to, the magnitude of voltage and/or current present on the DC bus 25 or at the output terminals 35 of the motor drive 10. The processor 50 executes a control module responsive to the reference signal and the feedback signals providing, for example, voltage and/or current signals corresponding to one or more phases of the desired output voltage to be provided to the motor 40. The control module generates a voltage reference signal which, in turn, is provided to a modulation module. The modulation module generates gating signals 31, for example, by pulse width modulation (PWM). The modulation module may be executed in the processor 50, in a dedicated gate driver 60 circuit, or a combination thereof. Optionally, the gate driver 60 circuit may be incorporated into the processor 50. The gating signals 31 subsequently enable/disable the transistors 32 responsive to provide an output voltage to the motor 40 to provide the desired operation defined by the reference signal.

Figure 2:
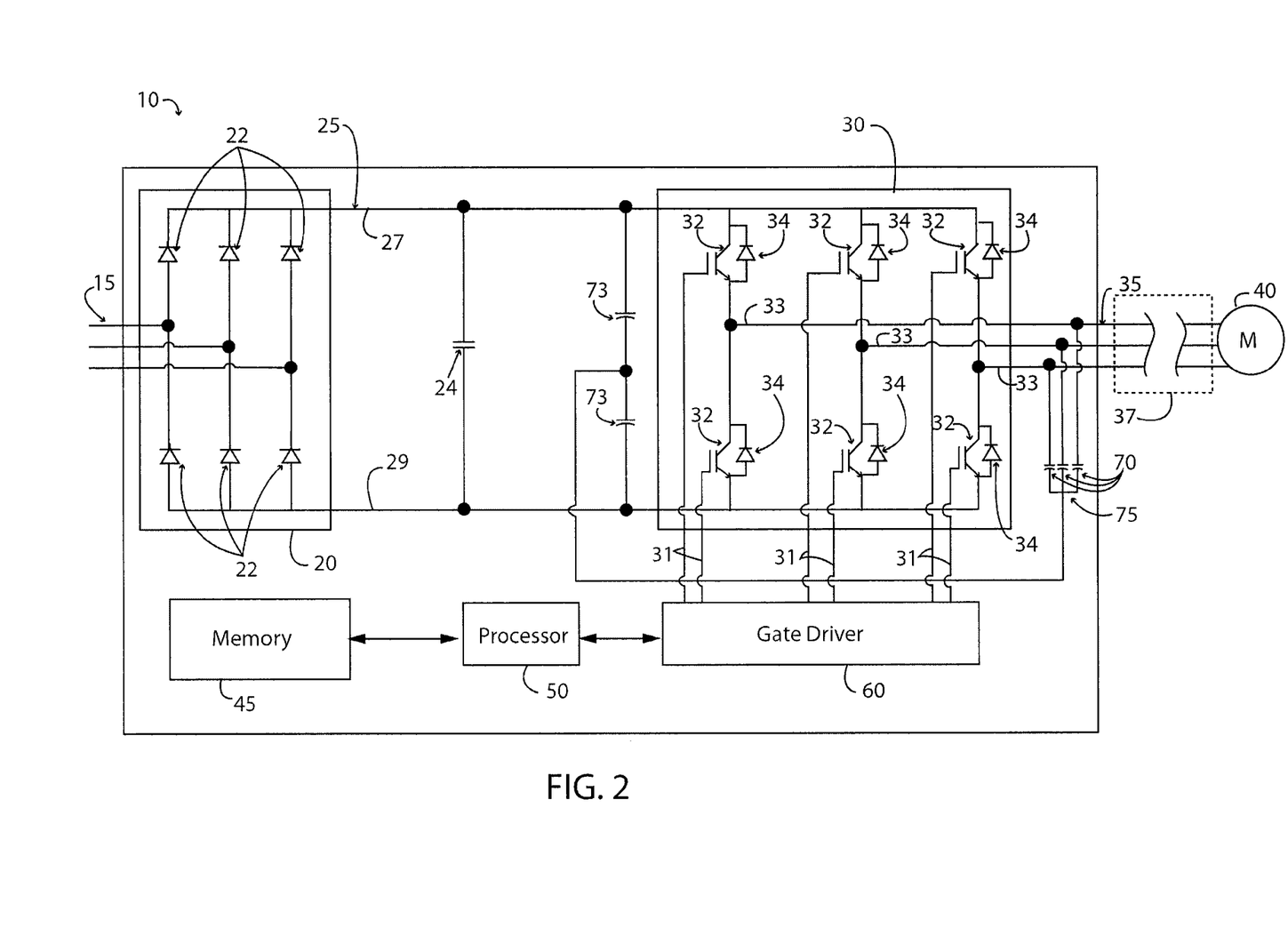
FIG. 2 is a schematic representation of a motor drive incorporating another embodiment of the present invention.

The inverter section 30 includes a filter mounted within the motor drive 10 and electrically connected between the transistors 32 and the output terminals 35 of the motor drive 10. According to the illustrated embodiment of the invention, a three phase motor 40 is connected to the motor drive having three pairs of transistors 32 selectively connecting each output phase either to the positive rail 27 or to the negative rail 29 of the DC bus 25. A capacitor 70 is connected between each of the output electrical conductors 33 and a common electrical connection 75. The common electrical connection 75 may be a single point or, optionally, may be multiple points having electrical connections established between each point. The common electrical connection 75 may be grounded, as shown in FIG. 1, or left floating, as shown in FIG. 2. A grounded common electrical connection 75 is connected either directly or through one or more other connections to an electrical conductor referenced to earth ground, also called a ground connection 80. A floating common electrical connection 75 is a connection point within a circuit that is not coupled to an external reference point, such as earth ground, and the voltage potential at the common electrical connection 75 may change, or float, as a function of the operating conditions of the circuit. It is contemplated that a similar filter may be included in an active rectifier section (not show) including switching elements such as transistors to rectify the DC voltage which also permits the motor drive 10 to deliver regenerative power from the DC bus 25 back to the input power source 15.

Figure 3:
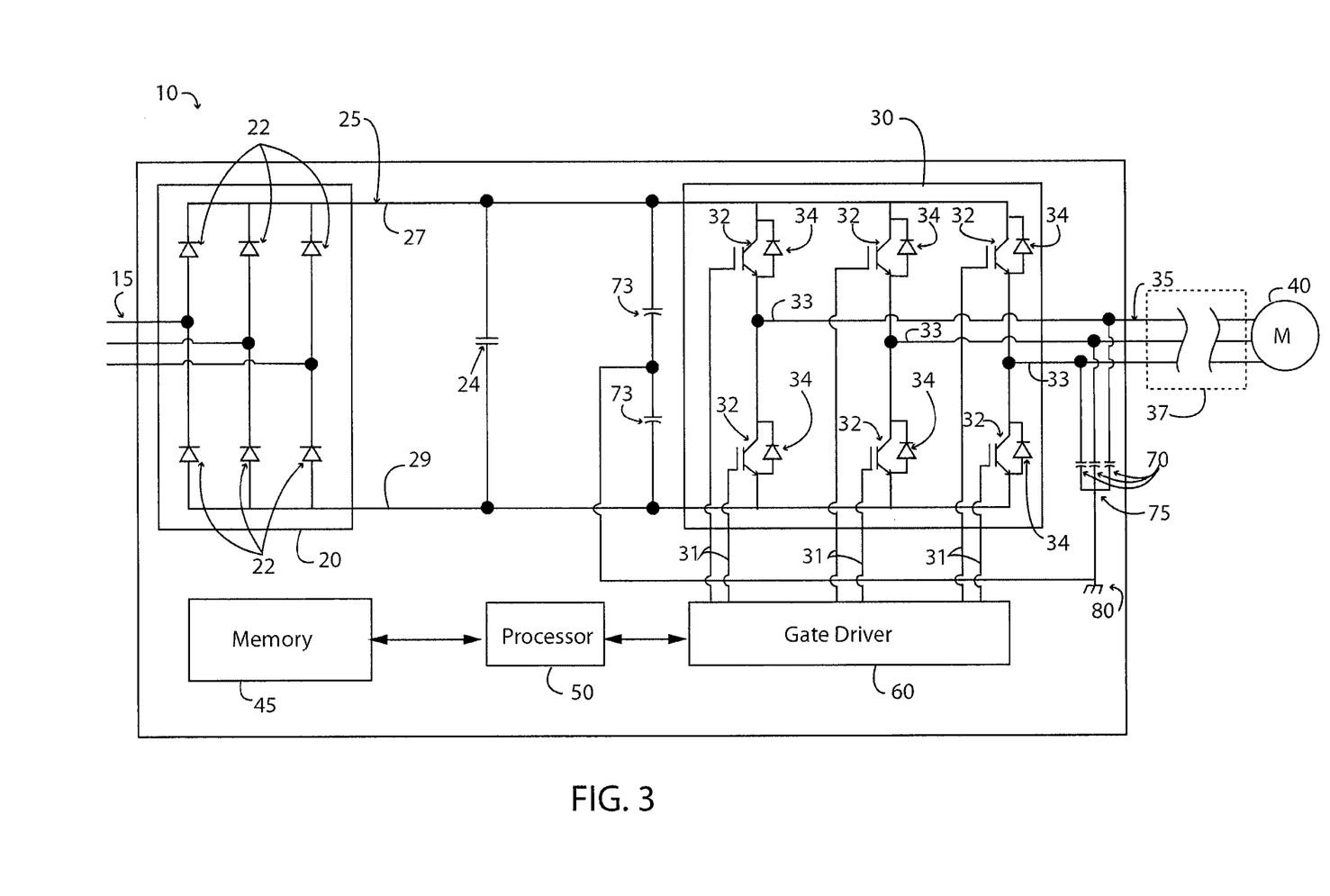
FIG. 3 is a schematic representation of a motor drive incorporating another embodiment of the present invention.

Referring next to FIGS. 2 and 3, additional capacitors 73 may be included within the motor drive 10 to further reduce the radiated emissions. A first additional capacitor 73 is connected between the positive rail 27 and the common electrical connection 75, and a second additional capacitor 73 is connected between the negative rail 29 and the common electrical connection 75. As shown in FIG. 2, the common electrical connection 75 may be floating or, as shown in FIG. 3, the common electrical connection 75 may be connected to a ground connection 80.

Figure 4:
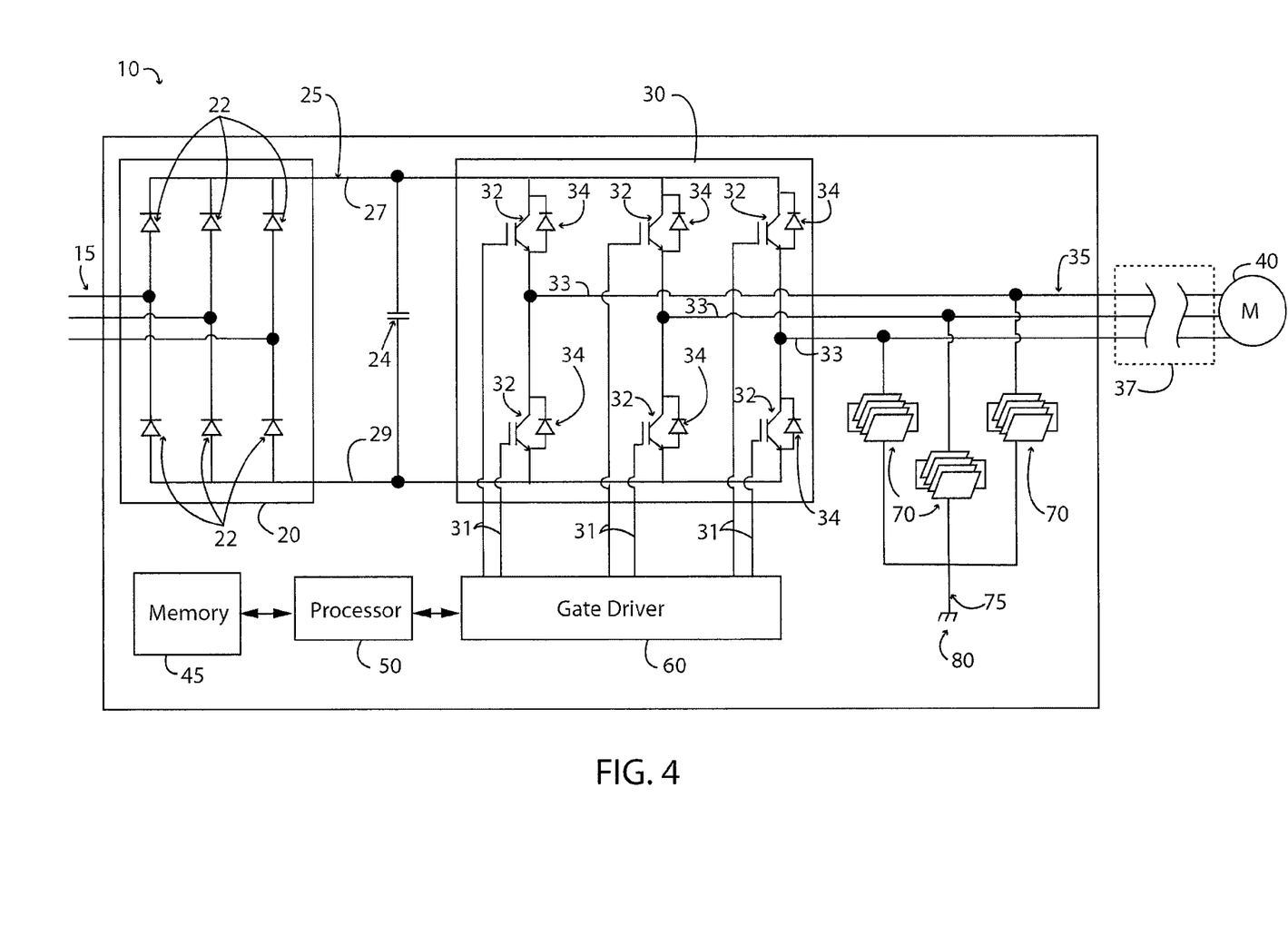
FIG. 4 is a schematic representation of a motor drive incorporating another embodiment of the present invention.
Figure 5:
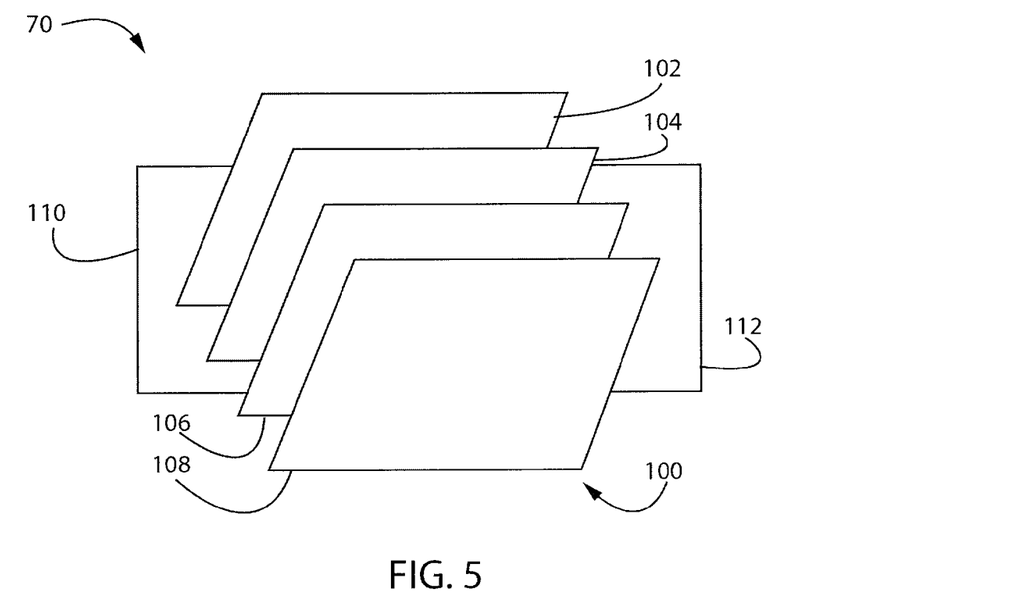
FIG. 5 is a partial sectional view the circuit board according to FIG. 4.
Figure 6:
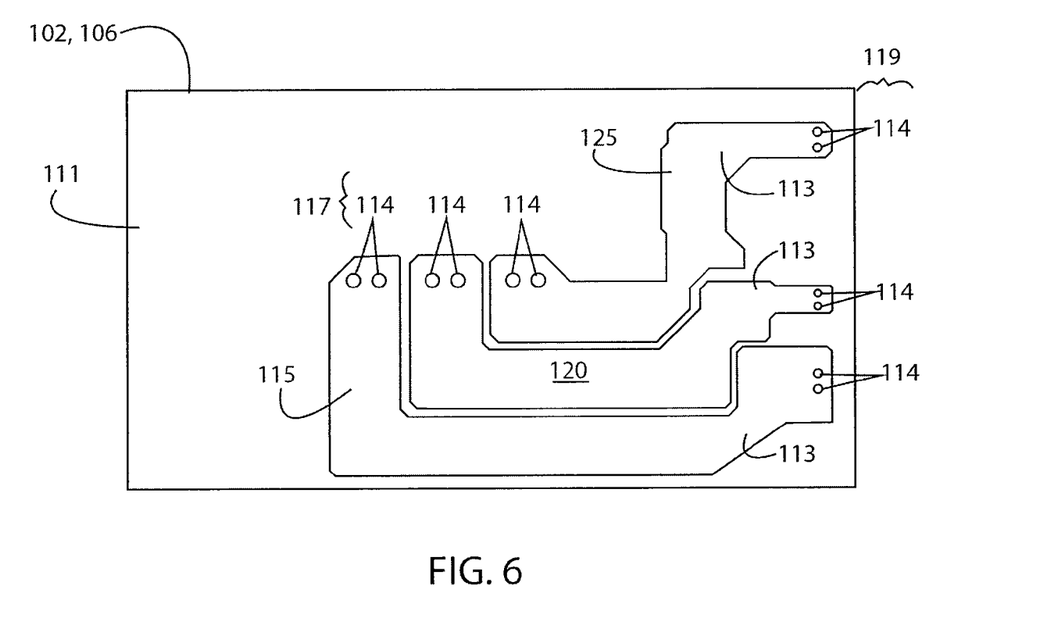
FIG. 6 is a partial top plan view of one layer of the circuit board according to FIG. 4.

Referring next to FIGS. 4-6, each capacitor 70 may be defined by the circuit board 100 on which the inverter section 30 is mounted. The circuit board 100 may be a multi-layer board having, for example, 4 layers, 6 layers, or any other suitable number of layers according to the application requirements. Each layer of the circuit board 100 is made up of a substrate material 111 overlaid with a layer of conductive material 113. During fabrication, a portion of the conductive material 113 is removed from the substrate 111, defining the desired conduction paths for each layer of the circuit board 100. The capacitance is defined, at least in part, by the surface area of a plane of conductive material 113 on a first layer connected to one of the output electrical conductors 33, the surface area of a plane of conductive material 113 on an adjacent layer connected to the ground connection, and the separation between the planes of conductive material. Optionally, the plane of conductive material 113 on the first layer may be the electrical conductor 33 between the transistor 32 and the output terminal 35.

According to one embodiment of the invention, a first layer 102 includes a first conductive plane 115 configured to be connected to a first of the electrical conductors 33 for a first phase of the AC output voltage, a second conductive plane 120 configured to be connected to a second of the electrical conductors 33 for a second phase of the AC output voltage, and a third conductive plane 125 configured to be connected to a third of the electrical conductors 33 for a third phase of the AC output voltage. Vertical interconnect access points (vias) 114, which establish vertical electrical interconnections between different layers of conductive material 113 on the multilayer circuit board 100, are located in each of the conductive planes 115, 120, 125. A first set of vias 117 within each of the planes 115, 120, 125 is positioned proximate to each other and are configured to receive terminals from a power module containing the switching devices. A second set of vias 119 within each of the planes 115, 120, 125 are positioned proximate to one edge of the circuit board 100 and are configured to connect to the output terminals 35 of the motor drive 10. A second layer 104 includes a conductive plane connected to ground, defining a ground plane. A capacitance is defined between each of the conductive planes 115, 120, 125 on the first layer 102 and the ground plane on the second layer 104. The magnitude of the capacitance is a function of the area of each of the conductive planes 115, 120, 125, the ground plane, and the separation therebetween. The size of the conductive planes may be selected to achieve a desired capacitance value, the calculation of which is discussed in more detail below.

It is further contemplated that the circuit board 100 may include additional layers. For example, a third layer 106 has a corresponding set of conductive planes 115, 120, and 125 each connected to the respective electrical conductor 33 as the conductive planes 115, 120, 125 of the first layer. A fourth layer 108 has a conductive plane also connected to ground, defining another ground plane. Thus, a second capacitance is established between each of the conductive planes 115, 120, 125 of the third layer 106 and the ground plane of the fourth layer 108. Each of the conductive planes 115, 120, 125 in the first layer 102 are electrically connected to the corresponding conductive planes 115, 120, 125 in the third layer 106. Similarly, each of the ground planes is electrically connected to the other ground planes. The electrical connection 110 between the first layer 102 and the third layer 106 is graphically illustrated as being external to each layer 102, 106. However, it is contemplated that vias 114 extending between layers accomplish the desired electrical connection 110. Similarly, the electrical connection 112 between the second layer 104 and the fourth layer 108 is graphically illustrated as being external to each layer 104, 108. Again, it is contemplated that vias 114 extending between layers accomplish the desired electrical connection 112. Because each of the corresponding layers are electrically connected, the first capacitance, defined between the first layer 102 and the second layer 104, and the second capacitance, defined between the third layer 106 and the fourth layer 108, are connected in parallel increasing the overall capacitance between the respective electrical conductor 33 and the ground connection 80. Still additional layers may be added as necessary to achieve a desired capacitance value.

Figure 7:
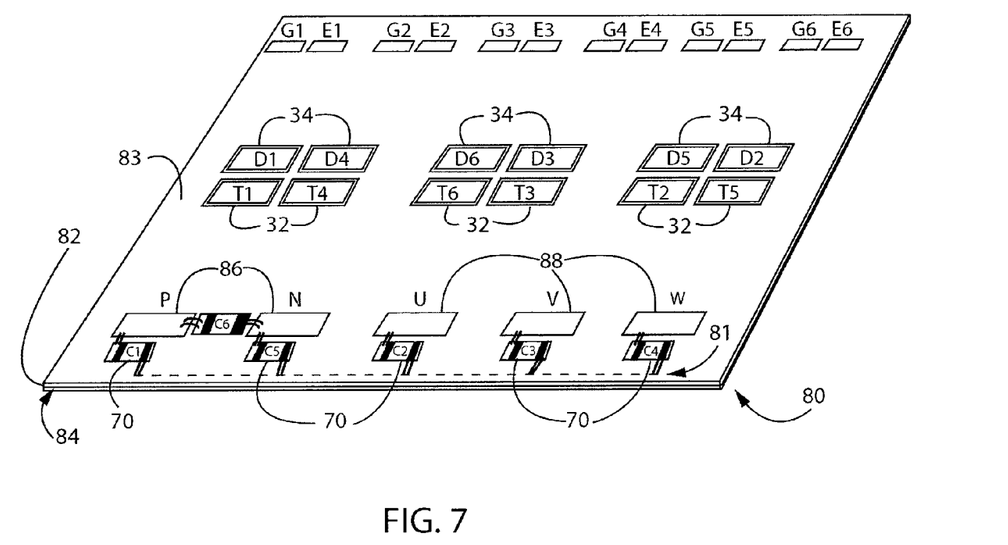
FIG. 7 is a block diagram representation of a power module incorporating one embodiment of the present invention.

Referring next to FIG. 7, each of the switching elements of the inverter section 30 may be contained within a single power module 90. As illustrated, the power module 90 includes a direct bond substrate 82 that is generally planar and includes a first surface 83 and a second surface 84, opposite the first surface 83. A copper baseplate 80 is mounted to the second surface 84 of the substrate 82 and copper forms (not shown) may be mounted to the first surface 83 or, optionally, a second copper layer may be mounted to the first surface 83 and etched to form the desired copper forms. Silicon dies are mounted to the copper forms on the second surface 84 defining the transistors 32 and their corresponding diodes 34. The copper baseplate 80 is connected to ground, and vias extend between the first surface 83 and the second surface 84 to provide a ground connection on the first surface 83 of the substrate 82. Each of the input terminals 86, output terminals 88, and transistors 32 along with their corresponding diodes 34 are represented in block diagram form. The input terminals 86 include an input, P, for the positive rail 27 and an input, N, for the negative rail 29. An output terminal 88 is provided for each phase of the AC output voltage, U, V, and W. Surface mount capacitors 70 are wire bonded to the input terminals 86 and output terminals 88 at a first end of each capacitor 70, the first end located proximate to the respective terminal 86, 88. A second end of each capacitor 70 is connected to a common electrical connection 81. According to one embodiment of the invention, the common electrical connection 81 is the copper baseplate 80 connected to ground.

Figure 8:
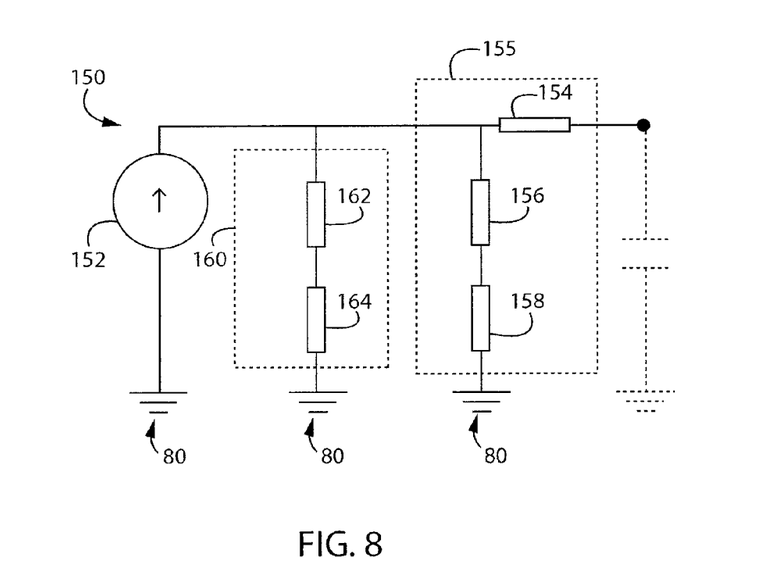
FIG. 8 is a schematic representation of impedances present at the output of the motor drive of FIG. 1.

Referring next to FIG. 8, an equivalent circuit 150 for a single output phase, illustrating the source and effects of radiated emissions between the motor drive 10 and motor 40, is used to select the desired value of the capacitors 70. The noise generated by switching the transistors 32 to generate the desired output voltage is modeled as a constant current source 152. The cable 37 between the drive 10 and motor 40 is modeled within box 155. Typically, the cable 37 includes an electrical shield surrounding the power conductors. The shield is configured to receive at least a portion of the radiated emissions. Connecting the shield to ground 80 establishes a conduction path for the emissions received by the cable 37, preventing them from being emitted into the environment. As illustrated, the shield itself is modeled as a first shield impedance 156 between the cable 37 and ground 80. In addition, the terminating connection, which may be a wire or other suitable electrical conductor, extending between the shield and the ground connection is modeled as a second shield impedance 158 between the cable 37 and ground 80. The magnitude of the radiated emissions is determined as a function of a radiation impedance 154 of the cable 37 and the magnitude of the noise current conducted through the radiation impedance 154. Thus, to reduce the magnitude of radiated emissions, it is desirable to select capacitors that have a feedback impedance 160 of sufficiently low magnitude to draw a portion of the noise current, represented by the current source 152, through the shield conduction path rather than through allowing it to be conducted through the cable 37.

Selection of the desired capacitance value begins by first identifying the frequency having the highest magnitude of noise current. The cable 37 is connected between the motor drive 10 and motor 40 with the shield connected to ground 80. The motor drive 10 is operated normally and the noise current on the output 35 to the motor 40 is measured. A spectral analysis of the measured current provides details of the magnitude and frequency content of the noise current. The frequency at which the magnitude of the measured current most exceeds a desired threshold is the target frequency for reducing radiated emissions. The desired amount that the current is to be reduced is also identified by comparing the magnitude of the current at the target frequency to the threshold value for that frequency.

Selection of the desired capacitance value continues by identifying the magnitude of the noise current at the target frequency. If neither the filter capacitor 70 nor the shield of the cable 37 is connected to ground 80, the equivalent circuit 150 of FIG. 8 reduces to a current source and the radiation impedance. Therefore, the current supplied to the motor 40 during normal operation of the motor drive 10 with no capacitor 70 connected and without the shield of the cable 37 connected, can be measured. A spectral analysis of the measured current provides details of the magnitude the noise current at the target frequency.

Having determined the magnitude of the noise current and the desired reduction in magnitude of the noise current, the shield of the cable 37 is reconnected to ground 80 and the current supplied to the motor 40 during normal operation of the motor drive 10 is again measured. The combined shield impedance (i.e. the sum of the first shield impedance 156 and the second shield impedance 158) is found by comparing the magnitude of the current measured without the shield connected to the magnitude of the current measured with the shield connected at the identified frequency.

Having determined the magnitude of the other elements in the equivalent circuit 150, the feedback impedance 160 is selected to provide the desired reduction of the noise current. The feedback impedance 160 includes a first impedance 162 which is a function of the capacitor 70 selected and a second impedance, which is a function of the "loop" impedance in the feedback path. The "loop" impedance is a function of all of the connective elements, including, but not limited to board traces, wires, and capacitor terminals used to connect the capacitor 70 between the electrical conductor 33 and the common electrical connection 75. A test capacitor having a known value is selected to be connected between each of the electrical conductors 33 and ground 80. The current supplied to the motor 40 during normal operation of the motor drive 10 is once again measured. The magnitude of the loop impedance is then determined at the identified frequency as the value of each of the other the elements in the equivalent circuit 150 is known. Finally, with the loop impedance known, the required capacitor value to achieve the desired reduction in magnitude of the current at the identified frequency is determined.

In operation, a motor drive 10 incorporating an exemplary embodiment of the invention is configured to receive 460 VAC, 60 Hz three-phase input power 15 at the rectifier section 20. The rectifier section converts the AC input voltage to a nominal 650 VDC voltage on the DC bus 25. The inverter section 30 is controlled by a modulation routine executing at 10 kHz to convert the 650 VDC voltage from the DC bus 25 into a variable magnitude and variable frequency AC voltage output to the motor 40, ideally controllable from 0-460 VAC and 0-60 Hz. This example is not intended to be limiting and the motor drive 10 may be configured to operate with input power having various other magnitudes (e.g., 200, 230, or 400 VAC) and frequencies (e.g., 50 Hz) and generate other ranges of output voltages as a function of the input voltage and of the motor 40 connected to the motor drive 10.

The electrical conductors 33 that conduct the AC voltage to the output 35 of the motor drive 10 are subject to voltages having magnitudes of 650 V, which are switched on and off at least once during the modulation period. Further, the transistors 32 may be configured to turn on or off within tens or hundreds of nanoseconds and the diodes 34 may have similar recovery times. It is known that the current through a capacitor is determined according to Eq. 1, where C is the capacitance value and dv/dt is the rate of change of voltage across the capacitor. Consequently, a capacitor connected at the electrical conductors 33 may be subject to a voltage potential changing 650 volts in, for example, 100 nanoseconds.

$$I = C\frac{dv}{dt} \qquad (1)$$

Selection of the desired capacitance, according to an exemplary embodiment of the invention, is described. The frequency range of the radiated emissions of concern may be in the tens of megahertz and, more specifically, between 30-100 MHz. The magnitude of the noise current is in the tens of microamps and, more specifically, between 70-80 µA. The impedance of the cable 37 is lowest at its resonant frequency and corresponds to a peak in the spectral content of the measured current to the motor 40. The magnitude and frequency of the highest peak which contributes to the undesired radiated emissions is identified.

Having identified the frequency of radiated emissions to target with the capacitors 70, the effects of the shield conductor are determined. The magnitude of the peak is compared to a desired threshold to determine how much to reduce the magnitude of the noise. After connecting the shield to ground, the radiated current is again measured. The ratio of the measured current with the shield connected compared to the measured current without the shield connected defines the ratio of the shield impedance to the combined shield impedance and radiation impedance 154. The radiation impedance 154 at the resonant frequency may be in the tens of ohms and, more specifically, may be between 30-50 ohms. The shield impedance is a function of the cable 37 used to connect the motor 40 to the motor drive 10 and may be, for example, in the tens of ohms.

Having determined combined shield impedance, the desired value of the capacitor 70 is determined. First, a test capacitor of a known value, for example, 1 nanofarad is inserted in the circuit and the loop impedance is determined. Finally, the value of the capacitor 70 required to provide the desired reduction in the radiated emissions is determined. However, care must be taken in locating the capacitor 70 with respect to the switching element.

Because the loop impedance is a function of all of the connective elements used to connect the capacitor 70 between the electrical conductor 33 and the common electrical connection 75, the greater the distance and the more connective elements that constitute the loop impedance, the greater the resulting value of the loop impedance. If the loop impedance is too large, it will, by itself exceed the desired feedback impedance 160. When surface mount capacitors 70 are used, the loop impedance may be, for example, between 5-15 ohms. Integrating the capacitors 70 in the circuit board 100 may reduce the loop impedance below 1 ohm. Further, the desired value of a surface mount capacitor 70 may be, for example, between 1-5.1 nanofarads while the desired value for a capacitor 70 integrated in the circuit board 100 may be less than 1 nanofarad.

In addition to the power conversion circuits (i.e., the rectifier section 20, DC bus 25, and inverter section 30), a motor drive 10 includes various logic circuits to perform, for example, control functions, communications, or to power external devices such as an encoder. Each of these logic circuits requires voltage at one or more voltage potentials. Consequently, the motor drive 10 may include a switched mode power supply configured to generate the necessary voltage potentials. The switched mode power supply in the motor drive 10 also includes a switching element and, therefore, may be the source of at least a portion of the radiated emissions from the motor drive.

Figure 9:
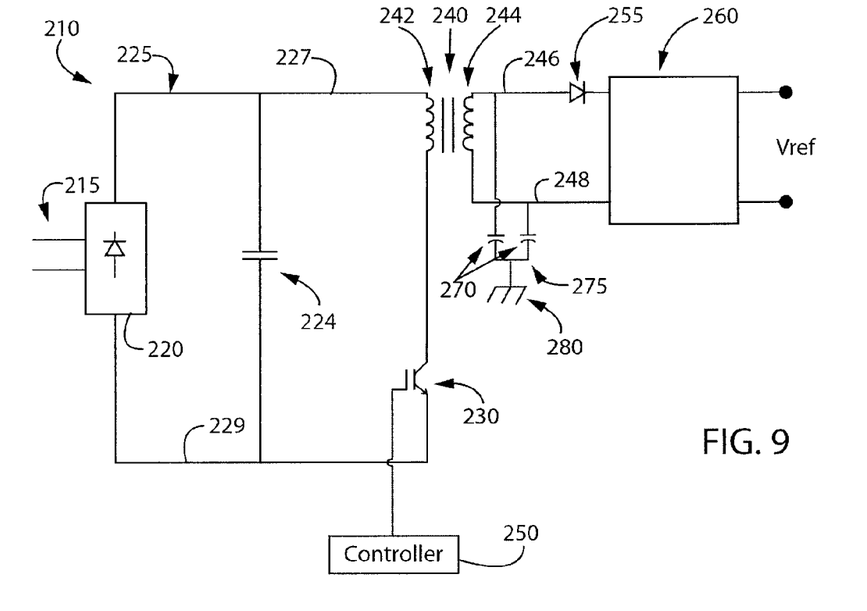
FIG. 9 is a schematic representation of a switched mode power supply incorporating one embodiment of the invention.

Referring next to FIG. 9, the above described filter may also be applied to the switched mode power supply 210 within the motor drive 10. The switched mode power supply 210, according to one embodiment of the invention, is configured to receive AC input power 215 at rectifier section 220. The rectifier section 220 may include any electronic device suitable for rectification as is understood in the art. The illustrated rectifier section 220 includes a set of diodes forming a diode bridge that rectifies the AC input power 215 to a DC voltage on the DC bus 225. The DC voltage potential is present between a positive rail 227 and a negative rail 229 of the DC bus 225. A DC bus capacitor 224 is connected between the positive and negative rails, 227 and 229, to reduce the magnitude of the ripple voltage resulting from converting the AC voltage to a DC voltage. It is understood that the DC bus capacitor 224 may be a single capacitor or multiple capacitors connected in parallel, in series, or a combination thereof. The magnitude of the voltage potential between the negative and positive rails, 229 and 227, is generally equal to the magnitude of the peak of the AC input voltage.

The DC bus 225 is connected in series between the rectifier section 220 and a combination of the switching device 230 and a transformer 240. The switching element 230 is typically a solid-state device such as a transistor or thyristor as is known in the art. The switching element 230 is selectively enabled and disabled by the controller 250 to modulate the DC voltage present on the DC bus 225 to a pulsed voltage across the input 242 of the transformer 240. The transformer 240 may be a one-to-one transformer or be used to step up or step down the voltage potential from the input 242 to the output 244. Consequently, a pulsed voltage is present at the output terminals 246, 248 of the transformer 240. The modulation may be controller such that the pulsed voltage may be used directly as an AC voltage output or a diode 255 and other voltage regulation circuitry 260 may be inserted to rectify the AC voltage and supply a DC voltage output. The output voltage, $V_{ref}$, from the switched mode power supply 210 is then provided to the other logic circuits according to the requirements of the motor drive 10. Optionally, multiple transformers or multiple taps from the transformer 240 may provide output voltages, $V_{ref}$, at different voltage potentials according to the requirements of the motor drive 10.

Similar to the inverter section 30, discussed above, the switched mode power supply 210 includes a filter mounted at the output 244 of the transformer 240. According to the illustrated embodiment of the invention, the switching element 230 generates a pulsed, or alternating, voltage across the transformer 240. A capacitor 270 is connected between each of the output terminals 246, 248 from the transformer 240 and a common point 275. The common point 275 may be grounded, as shown in FIG. 9, or left floating.

Figure 10:
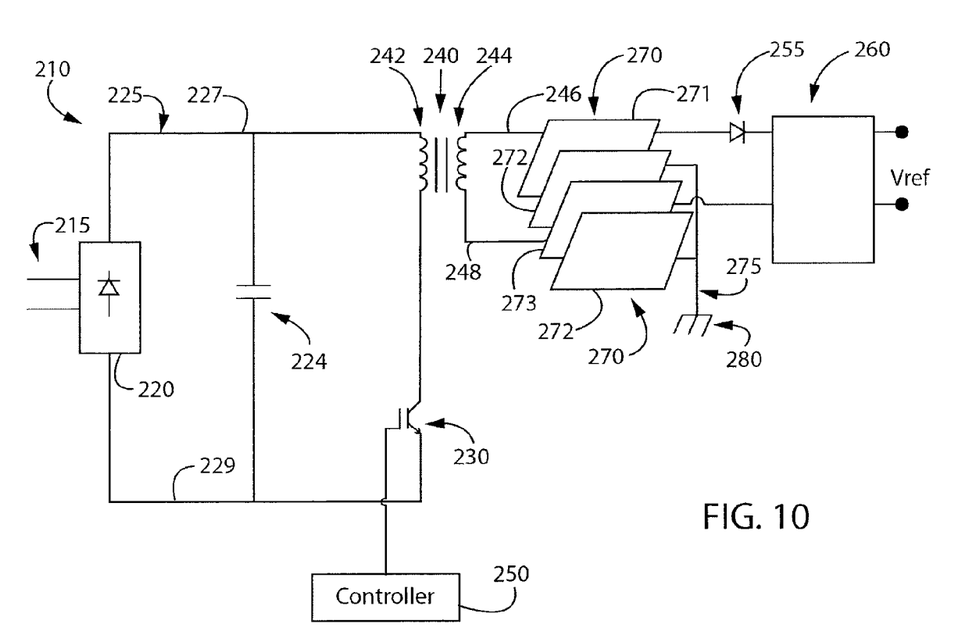
FIG. 10 is a schematic representation of a switched mode power supply incorporating another embodiment of the invention.
Figure 11:
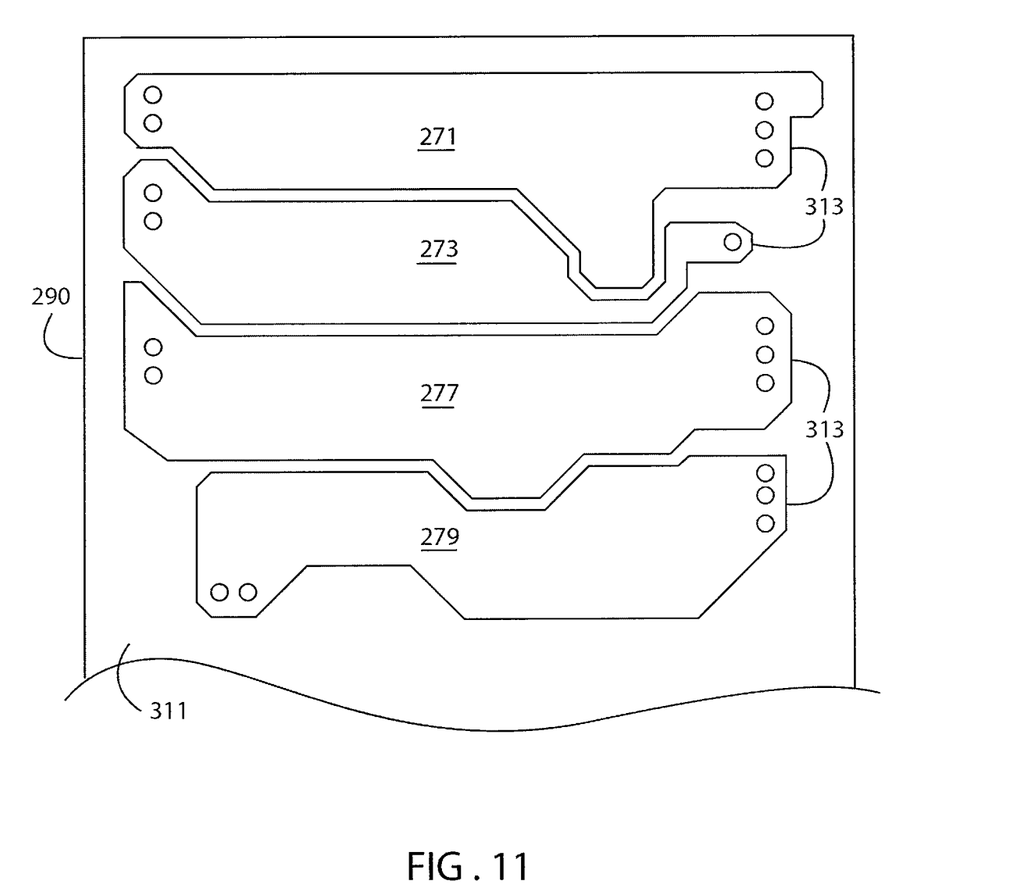
FIG. 11 is a partial top plan view of one layer of the circuit board according to FIG. 10.

Referring next to FIGS. 10-11, each capacitor 270 may be defined by the circuit board on which the switched mode power supply 210 is mounted. The circuit board may be a multi-layer board having, for example, 2 layers, 4 layers, 6 layers, or any other suitable number of layers according to the application requirements. Each layer of the circuit board is made up of a substrate material 311 overlaid with a layer of conductive material 313. During fabrication, a portion of the conductive material 313 is removed from the substrate 311, defining the desired conduction paths for each layer of the circuit board. The capacitance is defined, at least in part, by the surface area of a plane of conductive material 313 on a first layer, the surface area of a plane of conductive material 313 on a layer adjacent to the first layer, and the separation between the planes of conductive material 313.

According to one embodiment of the invention, a first layer includes a first conductive plane 271 configured to be connected to a first output terminal 246 of the transformer 240 and a second conductive plane 273 configured to be connected to a second output terminal 248 of the transformer 240. A second layer includes a conductive plane 272 connected to ground, defining a ground plane. A capacitance is defined between each of the conductive planes 271, 273 and the ground plane 272. The magnitude of the capacitance is a function of the area of each of the conductive planes 271, 273, the ground plane 272, and the separation therebetween.

It is further contemplated that the circuit board may include additional layers. For example, a third layer may have a corresponding set of conductive planes 271, 273 each connected to the respective output terminal 246, 248 of the transformer as the conductive planes 271, 273 on the first layer. A fourth layer may have a conductive plane 272 also connected to ground, defining another ground plane. Thus, a second capacitance is established between each of the conductive planes 271, 273 of the third layer and the ground plane 272 of the fourth layer. Each of the conductive planes 271, 273 in the first layer are electrically connected to the corresponding conductive planes 271, 273 in the third layer. Similarly, each of the ground planes is electrically connected to the other ground planes. Because each of the corresponding layers are electrically connected, the first capacitance, defined between the first layer and the second layer, and the second capacitance, defined between the third layer and the fourth layer, are connected in parallel increasing the overall capacitance between the respective output terminal 246, 248 and the ground connection 280. Still additional layers may be added as necessary to achieve a desired capacitance value. Additional conductive planes 277, 279 may be included on the first layer, as shown in FIG. 11, to define additional capacitance values used, for example, by additional outputs from the transformer 240 which provide additional voltage potentials within the motor drive 10.

According to one embodiment of the invention, a power conversion section for a motor drive is configured to convert DC voltage present on a DC bus having a positive rail and a negative rail to an AC voltage present at an output. The power conversion section includes at least one switching device configured to selectively connect one of the positive terminal and the negative terminal to the output, at least one ground connection, and a capacitor electrically connected between each terminal of the output and one of the ground connections.

According to another embodiment of the invention, a power conversion section for a motor drive is configured to convert a DC voltage present on a DC bus having a positive rail and a negative rail to an AC voltage. The power conversion section includes a transformer having an input and an output, a switching device connected in series with the input of the transformer between the positive and negative rails of the DC bus, a first electrical conductor electrically connected to the output of the transformer and configured to conduct a supply side the alternating current, a second electrical conductor electrically connected to the output of the transformer and configured to conduct a return side of the alternating current, a first capacitor electrically connected between the first electrical conductor and a common electrical connection, and a second capacitor electrically connected between the second electrical conductor and the common electrical connection.

According to yet another embodiment of the invention, a power converter for a motor drive has a filter for reducing radiated emissions. The power converter includes an input, configured to receive a DC voltage having a positive terminal and a negative terminal, and at least one output, configured provide an alternating current (AC) voltage, the output having a supply terminal and a return terminal. A switching device is configured to modulate the DC voltage to the AC voltage. A transformer has an input and at least one output, wherein the input is connected in series with the switching device between the positive and negative terminals of the input and wherein each output of the transformer is connected to one of the outputs of the power converter. A capacitor is electrically connected between the supply terminal and the return terminal of each output.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention

We claim:

1. An inverter for a motor drive having a filter for reducing radiated emissions generated by the inverter, the inverter comprising:
    an input configured to receive a direct current (DC) voltage having a positive terminal and a negative terminal;
    an output having at least two terminals, the output configured to provide an alternating current (AC) voltage;
    at least one switching device configured to selectively connect one of the positive terminal and the negative terminal to the output;
    at least one ground connection;
    a capacitor electrically connected between each terminal of the output and one of the ground connections;
    a multilayer circuit board including:
        a first outer layer,
        a first interior layer defining a conductive plane for each phase of the AC output voltage,
        a second interior layer defining a ground plane, and
        a second outer layer; and
    a power module containing each of the switching devices wherein the power module is mounted on the first outer layer of the circuit board and includes a plurality of output terminals, each power module output terminal corresponding to one of the inverter output terminals and configured to be inserted into a via passing through the circuit board, each via is electrically connected on the first interior layer to the conductive plane for the corresponding phase of the AC output voltage, and wherein the capacitors electrically connected between each inverter output terminal and one of the wound connections is defined by a capacitance present between the conductive plane on the first interior layer and ground plane on the second interior layer of the circuit board.

2. The inverter of claim 1 wherein the multilayer circuit board further includes:
    a third interior layer defining a conductive plane for each phase of the AC output voltage; and
    a fourth interior layer defining a ground plane, wherein:
    each via configured to receive one of the power module output terminals is also electrically connected on the third interior layer to the plane for the corresponding phase of the AC output voltage, the ground planes of the second interior layer and the fourth interior layer are electrically connected, and the capacitors electrically connected between each inverter output terminal and one of the ground connections is defined by a first capacitance present between the conductive plane on the first interior layer and the ground plane on the second interior layer of the circuit board and a second capacitance present between the conductive plane on the third interior layer and the ground plane on the fourth interior layer of the circuit board.

3. The inverter of claim 1 further comprising:
a first additional capacitor electrically connected between the positive terminal of the inverter input and one of the ground connections; and
a second additional capacitor electrically connected between the negative terminal of the inverter input and one of the ground connections.

4. The inverter of claim 1 wherein the value of each of the capacitors is less than 10 nanofarads.

5. A power conversion section for a motor drive configured to convert a direct current (DC) voltage present on a DC bus having a positive rail and a negative rail to a three-phase alternating current (AC) voltage, comprising:
a first electrical conductor configured to conduct a first phase of the three-phase alternating current;
a second electrical conductor configured to conduct a second phase of the three-phase alternating current;
a third electrical conductor configured to conduct a third phase of the three-phase alternating current;
a plurality of switching devices, each switching device configured to selectively connect one of the positive rail and the negative rail to one of the first electrical conductor, the second electrical conductor, and the third electrical conductor;
a first capacitor electrically connected between the first electrical conductor and a common electrical connection;
a second capacitor electrically connected between the second electrical conductor and the common electrical connection;
a third capacitor electrically connected between the third electrical conductor and the common electrical connection;
a fourth capacitor electrically connected between the positive rail and the common electrical connection; and
a fifth capacitor electrically connected between the negative rail and the common electrical connection.

6. The power conversion section of claim 5 further comprising at least one ground connection wherein the common electrical connection is the ground connection.

7. The power conversion section of claim 6 further comprising a circuit board, wherein:
each of the switching devices is mounted on the circuit board;
a first ground connection is located on the circuit board proximate to the first electrical conductor;
a second ground connection is located on the circuit board proximate to the second electrical conductor;
a third ground connection is located on the circuit board proximate to the third electrical conductor;
each of the first, second, and third capacitor is a surface mount capacitor;
the first capacitor is mounted on the circuit board between the first electrical conductor and the first ground connection;

the second capacitor is mounted on the circuit board between the second electrical conductor and the second ground connection; and the third capacitor is mounted on the circuit board between the third electrical conductor and the third ground connection.

8. The power conversion section of claim 6 further comprising a multilayer circuit board, including:
a plurality of conductive planes defined on a first layer, each of the conductive planes corresponding to one of the first phase, second phase, and third phase of the AC voltage, and
a ground plane defined on a second layer, the second layer adjacent to the first layer within the multilayer circuit board, wherein each of the conductive planes is electrically connected to the electrical conductor for the corresponding phase.

9. The power conversion section of claim 5 wherein the value of each of the first capacitor, second capacitor, and third capacitor is less than 10 nanofarads.

10. A power converter for a motor drive having a filter for reducing radiated emissions, the power converter comprising:
an input configured to receive a direct current (DC) voltage having a positive terminal and a negative terminal;
an output configured provide a multi-phase alternating current (AC) voltage, the output having a terminal corresponding to each phase of the AC voltage;
a plurality of switching devices, wherein a pair of switching devices correspond to each output terminal and wherein a first of the pair of switching devices selectively connects the DC voltage positive terminal to the corresponding output terminal and a second of the pair of switching devices selectively connects the DC voltage negative terminal to the corresponding output terminal;
a capacitor electrically connected between each output terminal and a common electrical connection;
a first additional capacitor electrically connected between the positive terminal of the power converter input and the common electrical connection; and
a second additional capacitor electrically connected between the negative terminal of the power converter input and one of the common electrical connection.

11. The power conversion section of claim 10 further comprising at least one ground connection wherein the common electrical connection point is the ground connection.

12. The power conversion section of claim 11 further comprising a circuit board, wherein:
each of the switching devices is mounted on the circuit board;
one of the ground connections is located on the circuit board proximate to each output terminal;
each of the capacitors is a surface mount capacitor; and
each of the surface mount capacitors is mounted on the circuit board between the output terminal and the ground connection proximate to the corresponding output terminal.

13. The power conversion section of claim 10 further comprising a multilayer circuit hoard, including:
a plurality of conductive planes defined on at least one layer, each of the conductive planes electrically connected to one phase of the AC voltage, and
a ground plane defined on at least one layer, wherein each layer having the plurality of conductive planes corresponding to each phase of the AC voltage has a corresponding, adjacent layer having the ground plane.

14. The power conversion section of claim 10 wherein the value of each of the capacitors is less than 10 nanofarads.

\* \* \* \* \*